United States Patent [19]

Rahamim

[11] Patent Number: 5,541,990
[45] Date of Patent: Jul. 30, 1996

[54] COMPENSATED HYBRID

[75] Inventor: Raphael Rahamim, Orange, Calif.

[73] Assignee: Rockwell International Corporation, Seal Beach, Calif.

[21] Appl. No.: 270,538

[22] Filed: Jul. 5, 1994

[51] Int. Cl.[6] .................................... H04M 19/00
[52] U.S. Cl. .................. 379/402; 379/398; 379/399; 379/345
[58] Field of Search ..................... 379/402, 398, 379/399, 345, 405, 406

[56] References Cited

U.S. PATENT DOCUMENTS

| 4,989,243 | 1/1991 | Choi | 379/402 |
| 5,282,157 | 1/1994 | Murphy et al. | 379/402 |
| 5,333,192 | 7/1994 | McGinn | 379/402 |

*Primary Examiner*—Jeffery Hofsass
*Assistant Examiner*—Jacques M. Saint-Surin
*Attorney, Agent, or Firm*—George A. Montanye; David J. Arthur; Susie H. Oh

[57] ABSTRACT

A hybrid circuit for coupling a modem to an external telephone line substantially compensates for and thereby cancels reflected echo. The hybrid includes a transformer coupled between the telephone line and the modem transceiver, which includes a transmitter and a receiver. A matching resistor connected between the transceiver transmitter and the transformer at a hybrid point presents a matching impedance to the telephone line impedance. A feedback network is implemented between the transceiver receiver and transmitter to feed back sufficient voltage into the receive line to cancel echo produced at the hybrid point.

12 Claims, 1 Drawing Sheet

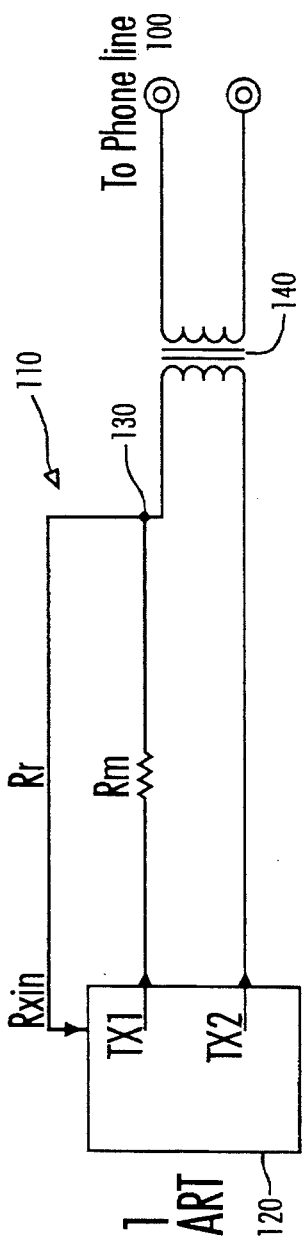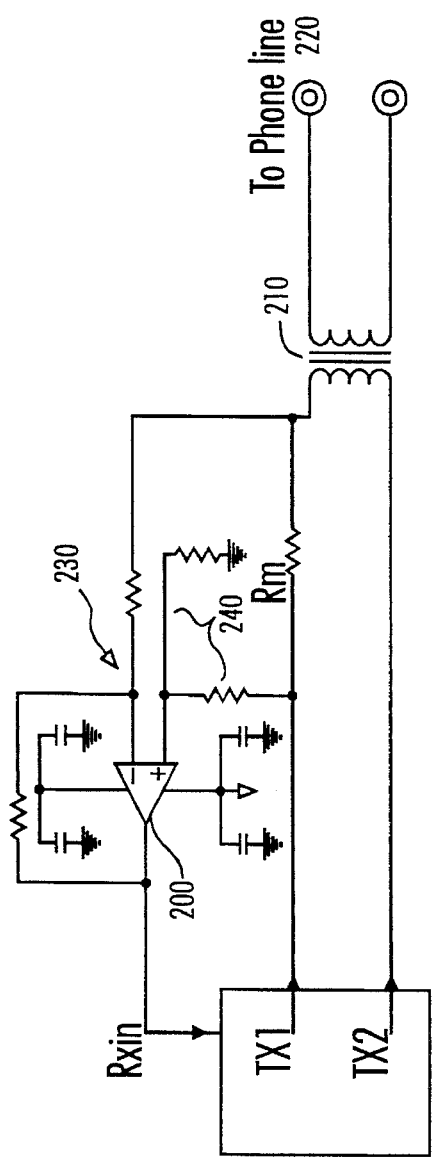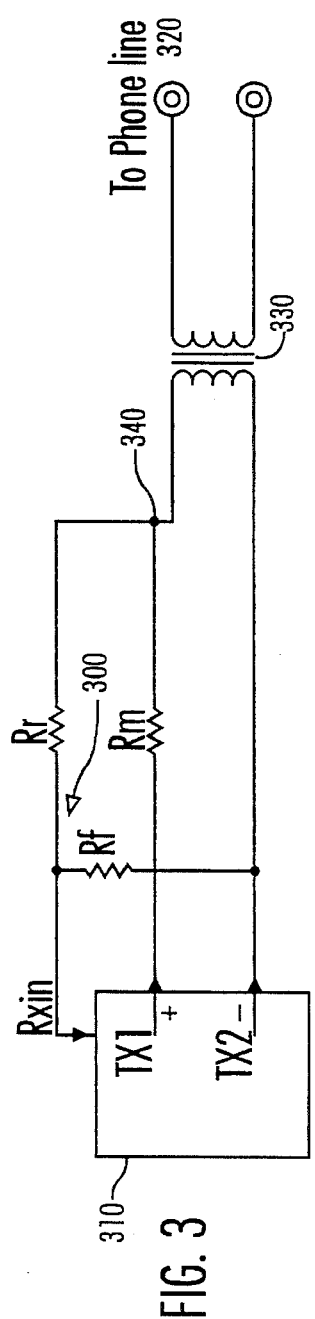

COMPENSATED HYBRID

BACKGROUND OF THE INVENTION

1. Field of the Invention

This invention relates to support circuitry for operating high speed modems, and particularly to a compensated hybrid wiring configuration in which echo attributable to internal transformer resistance is minimized.

2. Description of the Related Art

High speed modems typically require high performance support circuitry which may include transmission and receiver circuitry, combined in a transceiver, and data access arrangement circuitry. A hybrid coupling circuit, typically called a hybrid, couples the modem transceiver to an external telephone line. In such hybrid configurations, two wires extending from the transceiver are designated for output transmission to the telephone line, while an input line leads from the telephone line to the modem receiver.

The hybrid typically includes a transformer coupled between the external telephone line and the transceiver transmit and receive lines. The transformer, however, is associated with several inherent drawbacks, namely, distortion and echo characteristics which could significantly impair the overall modem transmission and reception performance. To minimize distortion, the transformer will be physically large. Accordingly, to maintain the proper transformer ratio, multiple windings around each transformer leg are necessary. The windings, however, tend to produce high internal DC resistance (DCR) within the transformer.

While distortion is a characteristic of the transformer alone, unwanted echo Is attributable to a combination of factors including the transformer internal DCR and mismatched impedances between the hybrid circuitry and the external telephone line. Echo, to a certain extent, is a desirable feature of telephone systems. During speech, echo allows the speaker to hear "side tones" of his or her own speaking voice over the telephone receiver. The desirable echo level, however, must be controlled so that the telephone users can hear themselves, as well as each other.

Modems, in contrast, do not require echo. A modem generally does not have to hear itself since a known, discrete amount of data is transmitted or received by the modem without necessitating any intermediate responses. Thus, the modem does not require reflection tones to indicate the speech level, etc. However, due to the internal DCR of the transformer which generally produces mismatched impedances between the transceiver and the telephone line, undesirable reflected echo may be generated. Thus, although it has been found that to minimize distortion, the transformer DCR must be increased, echo is also undesirably increased due to the higher DCR.

A characteristic of hybrid arrangements is trans-hybrid loss (THL). It has been found that to minimize undesirable echo on the modem lines, the THL must be maximized. As described above, however, the transformer DCR and distortion are inversely related. If the distortion is low, the DCR is high. Yet, a high DCR value results in high echo levels since the THL is dependent on the DCR. The mismatch of impedance within the hybrid causes higher echo which lowers the THL.

Accordingly, different hybrid circuits have been developed to meet the various requirements of modem support circuitry. These requirements include the following: (1) to provide proper internal impedance values to compensate for the transformer internal DCR such that the internal hybrid impedance matches that of the external telephone line; (2) to present a known, standard fixed loss (in dB) to the modem between the hybrid and the telephone line; (3) to provide sufficient feedback voltage to cancel the reflected echo. In this way, the incoming and outgoing signals can be distinctively received and transmitted, while the deleterious effects of transformer distortion and echo on modem performance are minimized.

For example, FIG. 1 illustrates a two wire telephone line interface 100 coupled to a conventional hybrid 110 and transceiver 120 arrangement. The transceiver functions as both a receiver and transmitter, and generally includes two transmit lines Tx1 and Tx2, and one receive-input line Rxin. Outgoing signals are sent from the transmit lines, while an incoming signal from the external telephone line is received on the Rxin line. Node 130 represents the hybrid point at which the incoming and outgoing signals may be superimposed. A transformer 140 is typically coupled between a matching resistor Rm and the telephone line 100.

As described above, the THL is dependent upon the transformer internal DCR which, in turn, tends to be proportional to the echo. To decrease echo, the THL must be increased. The THL is presented at the hybrid point 130, where the transmitted signal from Tx1 meets the received signal input into Rxin, in addition to the transmitted signal through the transformer. Due to the transformer DCR and the matched impedance requirement, however, the voltage levels imposed on the hybrid point 130 is imbalanced, producing an excess voltage which results in the undesirable echo directed into the receive input line.

To minimize power loss and echo, the internal impedance of the hybrid 110 should closely match the impedance of the telephone line 100. That is, the total impedance of the transformer and the matching resistor Rm Is preferably equal to the telephone line impedance. Thus, if the telephone line 100 has a 600 ohm impedance, and the transformer DCR is 100 ohms per winding, for a total resistance of 200 ohms, then to match the line, a 400 ohm matching resistor Rm is incorporated in the hybrid so that 600 ohms are seen on both sides of the telephone line 100 and the hybrid 110.

More simply, if an ideal transformer having zero resistance is used, and if the telephone line resistance is 600 ohms, the matching resistor value must be 600 ohms. If a voltage Vtx1 is output on the Tx1 line, and a voltage Vtx2 is output on the Tx2 line, then the voltage at the hybrid point 130 is zero since the Tx2 signal is merely an inverted form of the Tx1 line. Thus, the voltages at the hybrid point are canceled such that no echo is heard at the receiver, but only the telephone line input signal. However, because such ideal transformers are not typically used, most transformers have some resistance which may significantly affect the voltage level at the hybrid point, thus causing echo on the receiver line.

For example, returning to the example above in which the transformer resistance totals 200 ohms, requiring a 400 ohm matching resistor, the voltage at the hybrid point is one-third the voltage on the transmit lines. Consequently, the receiver will receive an echo having a voltage level of $Vrx=\frac{1}{3}*Vtx1$ since the drop of the outgoing transmitted signal through Rm is smaller than that through the 800 ohm total impedance (on the right side of the hybrid point 130 in FIG. 1). Thus, the receive input line receives both the received input signal as well as the echo comprising one-third of the voltage at Tx1. As a result, since the incoming received signal is expected to be 10 to 30 dB lower than Vtx, the receiver may not be able to distinguish between the desired signal and the echo.

Other hybrid designs have also been developed to reduce the effects of echo on modem performance. As shown in the hybrid of FIG. 2, an operational amplifier 200 ("op amp") having a differential input is connected to the Rxin line. The op amp 200 has several input connectors including: (1) a complex signal at pin 2 received via a feedback resistor network coupled to the transformer 210 and telephone line 220, including any reflected echo from the transformer, and (2) the voltage output via the resistor network 230 from the transmit line Tx1. Although the reflected transmission echo signal is still generated and sent back on the receive line, it is input into the inverting input pin of the op amp 200, illustrated in FIG. 2, while the resistor network 240 coupled to the Tx1 line forces the transmit voltage into the noninverting input of the op amp 200. Upon adding the two input signals, the output from the op amp 200 comprises generally the desired incoming signal since the voltage signals input into the inverting and noninverting inputs of the op amp 200 cancel each other.

In the above-described op amp configuration of FIG. 2, however, the values of the resistors comprising the resistor networks 230 and 240 must be accurately varied and adjusted to produce the desired voltage canceling effect to thereby minimize the echo. This system is generally accurate. However, such an op amp arrangement tends to add undesirable non-linear distortion, an inherent characteristic of operational amplifiers. In addition, such an op amp hybrid requires a substantially increased number of components, which significantly increases the complexity and cost of the overall circuit. Thus, the additional wiring, resistors, capacitors, and the op amp disadvantageously increase the complexity and size of the circuit, as well as the cost. The added external components also generate noise and distortion, thereby further limiting modem performance.

SUMMARY OF THE INVENTION

It is, therefore, an object of the present invention to provide an improved compensated hybrid circuit for a modem, thereby enhancing modem performance and canceling undesirable echo. In particular embodiments, the present invention is directed to a compensated hybrid device for incorporation into an integrated analog circuit of a modem system, in which distortion and echo are substantially reduced.

These and other objects are accomplished, according to embodiments of the present invention, by a hybrid which couples a modem transceiver to an external telephone line. The modem transceiver is provided with two output transmit lines for transmitting signals to the telephone line, and an input receive line for receiving signals. A feedback resistor is connected between the input receive line of the transceiver and one of the two output transmit lines. The hybrid includes a transformer coupled between the external telephone line connection and a matching resistor having a resistance which may vary according to the internal DCR of the transformer. A hybrid point is located at the node formed by the connection between the transformer, the matching resistor, and a receive resistor which is coupled between the hybrid point and the transceiver input receive line. By feeding some of the transmit voltage back into the receive line, any echo developed at the hybrid point can be substantially canceled before reaching the input receiver.

BRIEF DESCRIPTION OF THE DRAWINGS

The detailed description will be made in reference to the accompanying drawings, wherein like numerals designate corresponding parts in the several figures FIG. 1 illustrates a conventional hybrid interface circuit coupling a modem transceiver to an external telephone line.

FIG. 2 illustrates another conventional hybrid interface circuit.

FIG. 3 illustrates a compensated hybrid according to an embodiment of the present invention.

DETAILED DESCRIPTION

The following detailed description is not to be taken in a limiting sense, but is made merely for the purpose of illustrating the general principles of embodiments of the invention. The scope of the invention Is defined by the appended claims.

FIG. 3 is a schematic representation of a compensated hybrid circuit 300 according to an embodiment of the present invention. The hybrid provides for substantially reduced echo and distortion, while also reducing the number of circuit components, complexity and, therefore, cost. Consequently, modem operation is more efficient and performance is enhanced.

As shown in the preferred embodiment of the invention illustrated in FIG. 3, the hybrid is coupled to a modem transceiver 310 and external telephone lines 320. The transceiver 310 includes two output transmit lines Tx1 and Tx2, and one input receive line Rxin. The transmit lines allow outgoing transmission signals to be sent to the telephone line 320, while the Rxin line directs incoming signals into the modem transceiver. As indicated in FIG. 3, the transmitted signal at Tx1 is inverted at Tx2.

As will be discussed in more detail below, the hybrid is preferably configured to meet the interface requirements of the modem coupled to the telephone line. In preferred embodiments, the hybrid (1) presents the correct internal impedance to match that of the telephone line, (2) maintains a fixed loss, e.g., 6 dB, between the telephone line and the receive input terminal, and (3) provides a feedback voltage to the receive line to cancel the reflected echo attributable to the transformer resistance. Accordingly, by utilizing minimal components, and thus requiring only a small amount of space within the modem, hybrid embodiments of the present invention provide for more accurate signal reception and clarity, while, meeting the necessary fundamentals of modem transceiver/telephone line interfaces.

It will be recognized that although references to particular resistances and resistors are made herein, other impedance devices may be implemented to achieve the desired signal amplitudes and phases. For example, depending upon the particular components used in the modem arrangement, inductors and capacitors may be used to attain complex signal and feedback values.

Referring to FIG. 3, a transformer 330 is connected between the telephone line 320 and one of the transmit lines Tx1 via a matching resistor Rm. The transformer provides high voltage, e.g. 1500 volts, isolation between the telephone line and the modem to ensure protection against unexpected power surges. Essentially, the transformer presents an impedance into the hybrid which must be compensated by the matching resistor to maintain a properly matched internal hybrid impedance relative to the reflected impedance of the external telephone line.

To meet the requirement that the impedances of the modem hybrid and the telephone line be matched, a matching resistor Rm is connected in series with the transformer to maintain the impedance balance. The value of Rm is varied in accordance with the internal transformer DCR. Depending upon the total resistance of the telephone lines, typically 600 ohms, the resistance of Rm is preferably equal to the telephone line resistance minus the transformer DCR. Rm is also coupled to the output transmit line Tx1 from which the transmit signal is transmitted through the transformer to the external telephone line.

Because the modem transceiver has been programmed to expect an inherent loss amount, e.g., 6 dB, a resistor Rr is coupled to the transceiver receive input line on which input signals from the telephone line are received, to vary and therefore control the expected fixed loss between the hybrid and the telephone line. This expected loss is typically about 6 dB and is expected of the input receive signal, which has been transmitted by the external telephone line, when it arrives at the transceiver input terminal. Thus, by adjusting the resistance presented by Rr, the known, desired fixed loss value can be maintained.

Opposite the receive input terminal connection of Rr, the resistor Rr is connected to Rm and the transformer 330. The node 340 at which Rr, Rm, and the transformer meet is the hybrid point. The hybrid point 340 also represents the point at which the voltages between the transmit and receive lines meet. For example, if the remains of a transmitted differential voltage coming from either side of the hybrid point is imbalanced, then undesirable echo is reflected in the receive line. This echo merges with the received external telephone line signal, such that the modem receives more of its own transmitted signal, rather than the received signal. Consequently, the modem transceiver is unable to "hear" the received signals, and may lose all incoming signals.

In embodiments of the present invention, however, the reflected echo is substantially canceled before reaching the input receive terminal Rxin of the modem transceiver via a voltage divider circuit which comprises a combination of Rr and a feedback resistor Rf. The voltage divider circuit causes a feedback signal to be directed into the receive input line to cancel the echo reflected from the hybrid point. The resistance of the feedback resistor Rf is preferably selected according to the amount of echo to be canceled, yet also to maintain the correct internal impedance of the hybrid to match that of the external line.

The feedback connection between the Tx2 line and the Rxin line allows a portion of the voltage at Tx2 to be delivered into the receiver input. Since the output signal at Tx2 is inverted, the feedback voltage is likewise inverted to cancel the echo produced at the hybrid point 340. Thus, rather than requiring an expensive and complex hybrid network which includes an op amp, resistors, and capacitors, embodiments of the present invention significantly reduce signal distortion, as well as the size and cost of interfacing a modem with an external telephone line by simply feeding back part of the inverted transmit signal.

More particularly, for example, if the transformer resistance equals 200 ohms (100 ohms per winding) and if the telephone line resistance is the standard 600 ohms, then a 400 ohm matching resistor Rm is selected. It can be seen that the internal hybrid resistance is equal to, and thus matched with, the line resistance, satisfying one of the hybrid design criteria described above. Thus, when a signal is transmitted from the Tx1 output line through Rm, and an equal but opposite signal is transmitted from the Tx2 output line through the telephone line and the transformer resistances, it will be recognized that the voltage developed due to Tx1 at the hybrid point 340 (FIG. 2) is greater than the voltage developed due to Tx2 because the total resistance (i.e., Rm) on the left side is less than the resistance of the telephone line plus the transformer internal DCR.

Accordingly, it will be recognized that the resultant voltages at the hybrid point 340 do not cancel each other. The remaining difference in the voltages at the hybrid point 340 consequently causes undesirable echo to be produced and directed into the receive input terminal Rxin together with the received input signal from the telephone line 320. In accordance with embodiments of the present invention, however, this undesirable echo is substantially canceled by the feedback network comprised of resistors Rr and Rf.

The resistances of the receive line resistor Rr and the feedback resistor Rf must be coordinated to provide just enough feedback voltage into the receiver input to cancel the echo produced by the excess voltage remaining at the hybrid point. That is, the outputs of the two differential transmit terminals Tx1 and Tx2 must be essentially canceled by calculating how much of the output of Tx1 is being reflected due to the transformer's DCR. And thus, the feedback network must be particularly implemented to feedback a portion of the output at Tx2 to effectively negate the echo attributable to the voltage at Tx1. In addition, the feedback voltage must be sufficiently low to avoid interfering with the incoming received signal. Thus, particularly selected resistances for Rr and Rf are implemented such that the inverted feedback voltage originating from the Tx2 line adequately causes the echo voltage levels to be canceled, thereby significantly increasing the receiver "hearing," while decreasing distortion and echo.

In alternate embodiments, it will be recognized that other impedance components may be implemented to produce the desired echo canceling result. For example, a potentiometer or other resistor, inductor, and capacitor arrangements may be incorporated to produce the desired feedback voltage. Particularly, because the signal amplitude, in addition to the phase, may vary, other impedance devices may be used to provide the correct feedback signal. Concurrently, a network of inverters may also be utilized to vary the reference values within the hybrid.

Furthermore, although preferred embodiments of the present invention are described for use in modem interface applications, it will be recognized that those skilled in the art may find such hybrid arrangements useful in other electronic and communications applications.

The presently disclosed embodiments are to be considered to be, in all respects, illustrative and not restrictive. The scope of the invention should only be limited by the appended claims, rather than the foregoing description, and all changes which come within the meaning and range of equivalency of the claims are, therefore, intended to be embraced therein.

What is claimed is:

1. A hybrid circuit for coupling a transceiver to an external device, the external device having an associated impedance, and the transceiver having first and second differential transmit terminals and a receive terminal, wherein signals are transmitted via the transmit terminals and received via the input receive terminal, the hybrid circuit comprising:

a first impedance device extending from the first transmit terminal of the transceiver;

a transformer connected between the external device and the first and second transmit terminals, via the first impedance device, the transformer having an associated internal DC resistance (DCR) which causes undesirable echo to be produced, wherein the impedance of the first impedance device added to the transformer DCR approximately equals the impedance associated with the external telephone line, further wherein the connection of the transformer to the first impedance device comprises a node called a hybrid point, such that if the signals at the hybrid point are substantially unequal, undesirable echo attributable to the transformer DCR is produced within the hybrid circuit; and a feedback network coupled between the second transmit terminal and the hybrid point, the feedback network including a plurality of impedance devices, wherein a portion of the signal transmitted via the second transmit terminal is fed back to the receive terminal, wherein any echo produced at the hybrid point is canceled by the feedback signal.

2. The circuit of claim 1, further comprising a second impedance device connected between the transceiver receive terminal and the hybrid point, wherein the second impedance device provides for a fixed loss between the hybrid circuit and the telephone line.

3. The circuit of claim 2, wherein the feedback network includes a feedback impedance device and the second impedance device which are selected and coordinated such their impedances provide sufficient feedback signals to the receive terminal to cancel undesirable echo, and thereby clarify the incoming received signal.

4. The circuit of claim 1, wherein each of the first, second, and feedback impedance devices are resistors.

5. The circuit of claim 1, wherein the external device is a telephone line.

6. A hybrid circuit for reducing reflected echo from an external telephone line, between a modem data pump and the external telephone line, the circuit comprising:

a transceiver including a transmitter having first and second differential output transmit lines for outputting a voltage to the telephone line, wherein the voltage at the second transmit line is inverted from the voltage at the first transmit line, the transceiver also including a receiver having an input receive line for receiving a voltage from the telephone line;

a transformer coupled between the telephone line and the transceiver, the transformer having an associated internal impedance;

a first impedance device coupled in series with the transformer, between the first transmit line and the transformer, wherein the first impedance device and the transformer are connected at a node, called a hybrid point, further wherein reflected echo attributable to the transformer internal impedance originates at the hybrid point;

a second impedance device connected between the hybrid point and the input receive line; and a feedback network connected between the second transmit line and the input receive line, the feedback network comprising plural impedance devices coupled together, wherein a portion of the voltage output from the second transmit line is directed into the input receive line such that the echo reflected from the hybrid point is substantially canceled.

7. The circuit of claim 6, wherein the feedback network includes a feedback impedance device and the second impedance device, the feedback impedance device and the second impedance device being selected and coordinated to provide sufficient feedback to the receive line to cancel the reflected echo.

8. The circuit of claim 6, wherein the first impedance device is selected such that the total impedance of the first impedance device and the transformer internal impedance substantially equals the impedance of the telephone line, whereby the internal impedance of the hybrid circuit is substantially matched with the external telephone line impedance.

9. The circuit of claim 6, wherein the second impedance device is selected to maintain a predetermined signal loss between the telephone line and the modem data pump.

10. A method for reducing undesirable echo produced during the transmission and reception of signals by a modem transceiver having first and second transmit lines and a receive line, the transceiver being coupled to an external telephone line, the method comprising the steps of:

transmitting signals at the first and second transmit lines to the external telephone line, the transceiver and external telephone line being coupled via a transformer and a first impedance device, the connection of the transformer to the first impedance device defining a hybrid point, wherein the undesirable echo is produced at the hybrid point;

receiving signals from the telephone line by the transceiver receive line, the receive line being coupled via a second impedance device to the hybrid point; and feeding back a portion of the signals from the second transmit line to the receive line via a feedback impedance device, the portion of signals being sufficient to cancel the undesirable echo.

11. A method for compensating for undesirable echo between a modem and an external telephone line having a line impedance, wherein voltage signals are directed to and from the modem, the method comprising the steps of:

coupling a transceiver to a modem, the transceiver having first and second transmit lines and a receive line;

transmitting voltage signals through the transceiver transmit lines to the telephone line;

receiving voltage signals through the transceiver receive line from the telephone line;

coupling a transformer between the telephone line and the transceiver transmit lines, the transformer being associated with an internal impedance;

connecting a matching resistor in series between the transformer and the first transmit line, wherein the connection of the matching resistor to the transformer is called a hybrid point, further wherein if the voltage through the matching resistor is greater than the voltage through the transformer, echo is produced at the hybrid point; and connecting a feedback network between the receive line and the second transmit line, the feedback network comprising a second resistor connected between the receive line and the hybrid point, and a feedback resistor connected in parallel with the second resistor, the feedback resistor being connected between the receive line and the second transmit line, wherein the second resistor and the feedback resistor are connected such that a portion of the voltage at the second transmit line is fed back to the receive line to cancel the echo generated at the hybrid point.

12. The method of claim 11, further comprising the step of selecting the matching resistor such that the impedance of the matching resistor together with the internal impedance of the transformer substantially equals the line impedance of the telephone line.

* * * * *